April 17, 1951  F. H. MUELLER ET AL  2,549,702
FEED SLEEVE CONNECTION FOR DRILLING MACHINES AND THE LIKE
Filed March 7, 1949  3 Sheets-Sheet 1

INVENTORS
Frank H. Mueller &
John J. Smith.
BY
Cushman Darby Cushman
Attorneys.

April 17, 1951  F. H. MUELLER ET AL  2,549,702
FEED SLEEVE CONNECTION FOR DRILLING MACHINES AND THE LIKE
Filed March 7, 1949  3 Sheets-Sheet 2
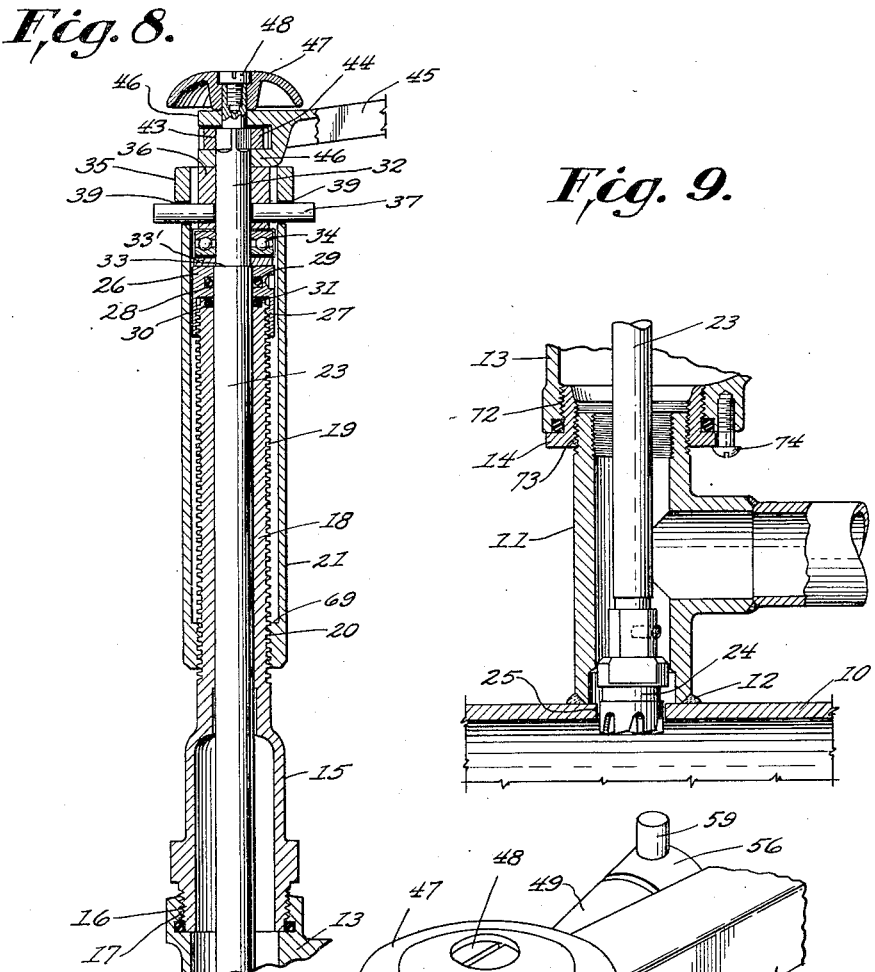
INVENTORS
Frank H. Mueller &
John J. Smith.
BY
Cushman Darby Cushman
Attorneys.

April 17, 1951 F. H. MUELLER ET AL 2,549,702
FEED SLEEVE CONNECTION FOR DRILLING MACHINES AND THE LIKE
Filed March 7, 1949 3 Sheets-Sheet 3
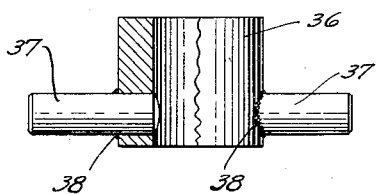
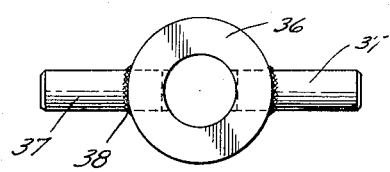
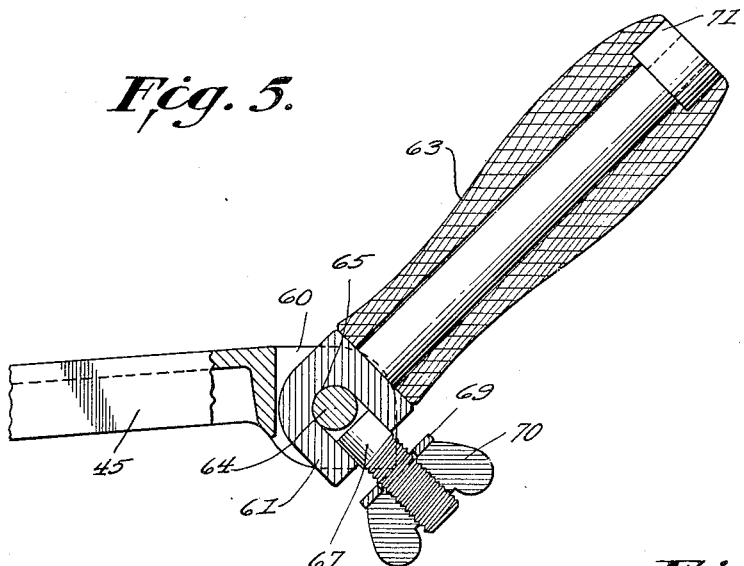
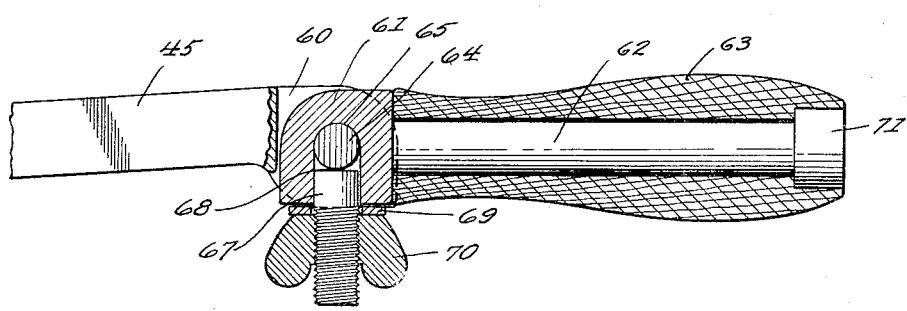
INVENTORS.
Frank H. Mueller &
John J. Smith
BY
Cushman Darby Cushman
Attorneys.

Patented Apr. 17, 1951

2,549,702

UNITED STATES PATENT OFFICE 2,549,702

FEED SLEEVE CONNECTION FOR DRILLING MACHINES AND THE LIKE

Frank H. Mueller and John J. Smith, Decatur, Ill., assignors to Mueller Co., Decatur, Ill., a corporation of Illinois Application March 7, 1949, Serial No. 79,942

4 Claims. (Cl. 77—37)

The present invention relates to a machine for drilling an opening in a service main so as to mount a T or branch connector on the main, and for plugging the T and inserting a stopper in the main.

An important object of the invention consists in providing a pipe tapping machine designed for light work such as drilling small holes through T's and line stopper fittings, with simple, efficient and economical means for forming an opening in the main at the point of connection of the T therewith and through which may be inserted an expandible rubber stopper to shut off gas or other fluids under pressure from a small main when it is desired to disconnect the service line for replacement or repair, and also for inserting or extracting a threaded pipe plug from the T, stopper fitting and the like.

Heretofore in drilling a machine of this type, a feed sleeve has been associated with the machine and provided at its outer end with laterally projecting handles and a hinged yoke which straddles the boring bar and engages the outer face of a collar fixed thereon to apply axial thrust against the boring bar. It was found that in a light drilling machine the projecting handles provided so much torsional power that the tendency of the operator was to feed the boring bar too fast and not infrequently resulted in breaking the drill. Moreover, when expanding a rubber stopper to compress the stopper in such a machine, the pressure exerted on the stopper was so great as to mutilate and render the stopper useless for further service.

Accordingly, a further object is to provide a machine for drilling pipes and plugging T's in which the body of the machine is provided with an elongated externally threaded tubular member through which axially extends the boring bar or tool for tapping the service pipe or main. A manually operable internally threaded feed sleeve is connected to the tubular member so as to be axially movable thereon. Connector means within the feed sleeve provides for thrust engagement with the boring bar and is detachably connected to the feed sleeve so as to dispense with the use of laterally projecting handles and the hinged feed yokes as heretofore used in machines of this type. Thus, means are provided which simplifies the construction and operation of the machine and reduces to a minimum the number of parts necessary to efficiently tap the main and control the flow through the T or branch connector.

A still further object consists in providing a machine for drilling pipes and plugging T's in which the upper part of the machines includes two separate assembled units, one of which comprises the boring bar, a feed sleeve connector or collar, and the operating handle, so that when these parts are assembled they are bodily movable with the boring bar when the latter is moved axially in the machine. The other unit of the machine includes a feed sleeve which is formed at its outer end with a pair of oppositely disposed bayonet slots to which the connecting collar is detachably connected for the purpose of locking the feed sleeve and the boring bar against relative axial movement, but allows the sleeve to rotate independently of the boring bar with the result that not only is the boring bar substantially shortened but the machine is also made more compact and comprises a fewer number of parts, and is more economical than machines of this type as heretofore used.

Another object consists in associating with the boring bar a handle assembly which may be adjusted to operate as a crank for continuous rotation of the boring bar or as a straight lever. Additionally, the handle is operatively connected to a ratchet on the boring bar or tool by a reversible locking dog so that the boring bar may be either rotated in a clockwise or counterclockwise direction.

Other objects and advantages of the invention will become apparent from the following description when taken in conjunction with the accompanying claims and drawings.

Referring to the drawings:

Figure 1 is a side elevation of a drilling machine constructed in accordance with the invention and shown connected to a service main or the like.

Figure 3 is an enlarged detail perspective view of the upper end portion of the machine.

Figure 4 is a detail view of the adjustable operating member with parts in section and showing the handle clamped in its horizontal position.

Figure 5 is a detail view showing the handle in an intermediate or inclined position.

Figure 6 is a detail view with parts in section of the collar or sleeve connector.

Figure 7 is a plan view of Figure 6.

Figure 8 is a detail vertical sectional view of the upper portion of the machine, and Figure 9 is a detail vertical sectional view of the lower portion of the machine showing its connection with the service main.

Figure 1:
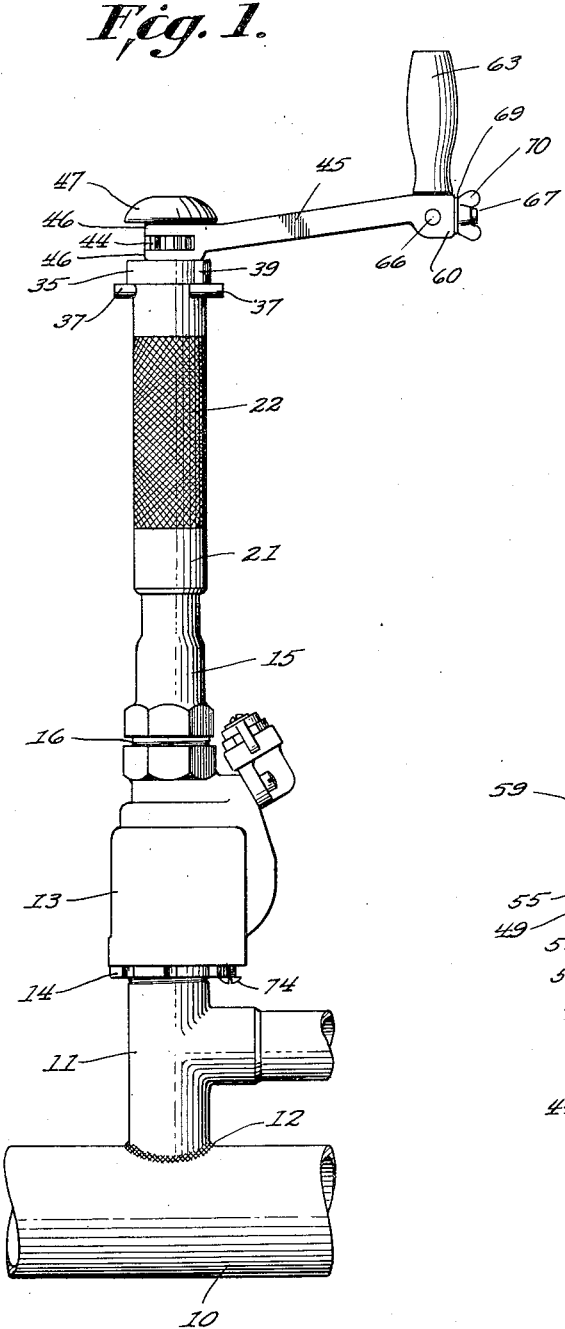

Referring to the drawings and, more particularly, Figure 1, 10 indicates a main or service pipe for conducting gas or other fluids under pressure, and to which is attached a service T or branch connector 11 by welding as at 12 at the point where the main is to be tapped. A flop valve casing or the like 13 may be connected to the upper end of the T by a threaded adapter 14. The drilling machine body 15 has an externally threaded lower end portion 16 (Fig. 8) that is connected to the internal complementary threads 17 formed on the upper end of the valve casing 13. The machine body 15 has extending upwardly thereof an elongated tubular portion 18 which is externally threaded as at 19 for a major portion of its length, so as to receive the internal threads 20 on the lower end of the feed sleeve 21 so that upon rotation of the sleeve relative to the fixed tubular portion 20, the sleeve is moved axially relative thereto. The outer surface of the feed sleeve 21 is preferably knurled or rough as at 22 (Fig. 1) to facilitate manual rotation of the sleeve. A suitable tool such as a boring bar or the like 23 is of such length as to extend axially through the machine body 15 and, as shown, has detachably connected to its lower end, a shell cutter or drill 24 (Fig. 9) for tapping and forming a lateral opening 25 in the main at the point where the T or branch connector 11 is to be mounted. When the cutter 24 is detached from the bar 23, a stopper or plug may be connected thereto as the particular operating conditions may require.

A packing cap 26 having a depending internally threaded skirt 27 (Fig. 8) threaded to the upper end of the tubular portion 18 of the machine body, is provided with an annular recess 28 in which is positioned an O-ring packing 29. The upper end of the tubular portion 18 may also be formed with an annular recess 30 for receiving an O-ring packing 31 that engages the boring bar 23 so as to coact with the packing 29 in order to provide a tight seal when the parts are set up. The boring bar 23 has an outer reduced end portion 32 that forms a shoulder 33 adjacent the packing cap 26. A washer 33' rests on the shoulder 33 and supports a ball bearing member 34 that loosely engages the reduced portion 32 of the boring bar. The upper or outer end of the sleeve 21 may be formed with an annular shoulder or flange 35. Loosely mounted on the reduced portion 32 of the boring bar and within the sleeve 21, is a collar or connector member 36 (Fig. 8) which has extending radially and outwardly therefrom diametrically disposed pins or lugs 37 that, as shown, are welded as at 38 (Fig. 6) to the collar 36, but may be formed integral or otherwise connected thereto. The outer end 35 of the sleeve 21 is formed with diametrically opposed bayonet slots 39, each of which has a vertical opening 40 (Fig. 3) that communicates with a transverse opening 41 having a notch or curved retaining portion 42 at the end thereof. The bayonet slots 39 are arranged to detachably receive the pins 37 for connecting the collar 36 to the feed sleeve 21. Above the collar 36 the reduced portion 32 of the boring bar 23 is provided with a polygonal portion 43 on which is fixed a ratchet wheel 44. An operating member or arm 45 has spaced ears 46 provided with vertical aligned openings through which extends the reduced portion 32 of the boring bar and which are disposed on opposite sides of the ratchet wheel 44. A retaining member or knob 47 is secured by a threaded kerfed bolt 48 to the outer end of the reduced portion 32 of the boring bar so that the washer 33', ball bearing member 34, collar 36, ratchet wheel 44, and operating handle 45, confined between the shoulder 33 and the retaining member 47, constitute an assembled bodily movable unit that is held against axial movement on the boring bar 23 and is movable axially with the bar. The tubular portion 18 of the machine body 15 and the feed sleeve 21 also constitute a separate assembled unit which cooperates with the pins 37 of the collar 35 to lock the feed sleeve and boring bar 23 against relative axial movement but leaves the sleeve and boring bar free to rotate independently of each other.

Figure 2:
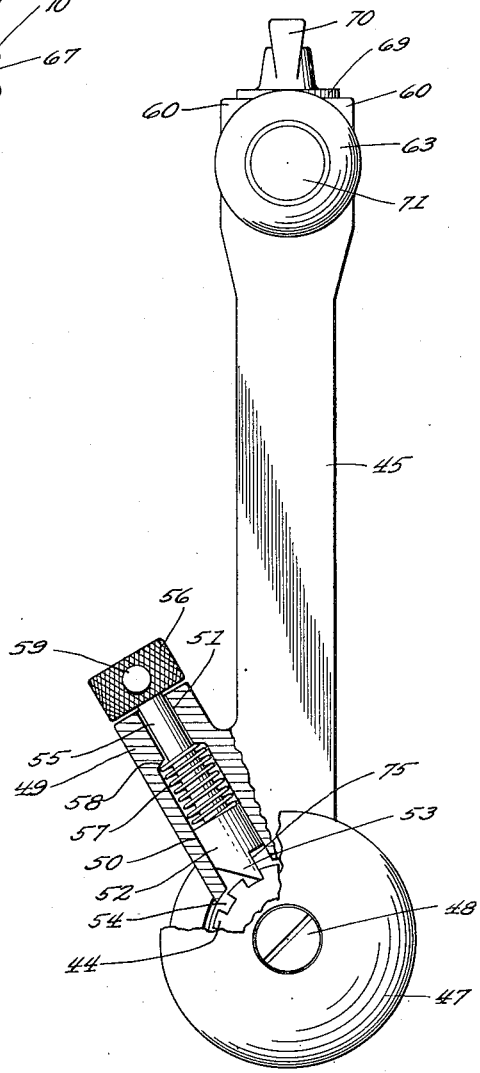
Figure 2 is a plan view of the parts in section.

The operating arm 45 is formed with a lateral offset boss 49 (Fig. 2) having a longitudinal bore 50 adjacent the ratchet wheel 44. The outer end of the bore 50 terminates in a reduced portion 51. Axially movable in the bore 50 is a ratchet dog 52 having a pointed or tapered portion or pawl 53 arranged to engage one of the teeth 54 of the ratchet wheel 44 so as to releasably lock the operating member 45 to the boring bar 23 in order to rotate the boring bar in clockwise direction. A stem 55 extends outwardly from the dog 52 through the reduced bore 51 and has a knurled head or knob 56. A coil spring 57 in the bore 50 surrounds the stem 55 and is confined between a shoulder 58 and the dog 52 so as normally to urge the latter inwardly into engagement with one of the teeth 54 of the ratchet wheel 44. A pin 59 is arranged to secure the head 56 to the stem 55 and also serves as an additional finger grip and an indicator for adjusting the direction of engagement of the pawl 53 with the teeth of the ratchet wheel. It will be seen that the ratchet engaging pawl 53 of the dog 52 may be reversed upon axial movement and rotation of the stem 55 upon manual pressure being applied to the head 56, so as to reverse its engagement with the ratchet wheel in order to rotate the boring bar 23 in an opposite or counter-clockwise direction when it is necessary to back the boring bar or drill out of the main or when inserting and extracting a plug in a T or other fitting, and that this may be readily accomplished by rotating the stem 55 through 180° from its position as shown in Figure 2.

The end of the operating member or arm 45, remote from its connection with the boring bar 23, is provided with spaced ears 60 between which is inserted an inverted U-shaped stud or block 61 (Fig. 4) connected to the inner end of a rod 62 on which is mounted the handle 63. A transverse pin 64 is soldered or otherwise connected as at 65 to the adjacent side of the stud 61 and has its ends 66 projecting outwardly therefrom (Fig. 1) so as loosely to extend through the ears 60 of the arm 45 in order to provide a pivotal connection of the handle 63 with the arm 45. A screw or threaded bolt 67 is welded as at 68 to the transverse pin 64 and extends outwardly from the stud 61 so as to receive a washer 69 and a wing nut 70. The outer end of the rod 62 may have an enlarged head 71 that fits in a recess in the end of the handle 63 for retaining the latter in position.

When the operating handle 63 is moved to its vertical position, as shown in Figure 1, it is firmly held in place by engagement of the washer 69 bearing against the outer ends of the ears 60 and is clamped in position by the wing nut 70. When the nut 70 is backed off, the screw 67, the nut 70 and the washer 69 may be slipped over the outer end corner of the arm 45 and the handle 63 may then be swung downwardly, as shown in Figure 5, until it is brought into horizontal alignment with the arm 45 (Fig. 4) where it may be locked in a fixed position by tightening up the wing nut 70 which bears against the washer 69 that in turn is in contact with the bottom of the ears 60 so as to form a rigid, straight, ratchet handle or lever. For ordinary work, the handle 63 is positioned as shown in Figure 1, so that the boring bar or tool can be continuously rotated such as when drilling small holes, inserting and extracting threaded plugs and T's, stopper fittings and the like which may be secured to the main by welding or the like. On the other hand, when the machine is being used in a narrow ditch or when drilling through the thick wall of a larger service pipe, the work can be expedited by adjusting the handle 63 so that it assumes a straight line position, as shown in Figure 4, in order to provide greater leverage or to facilitate rotation of the boring bar or drill in short movements. When the tool or boring bar 23 is removed from the machine, any suitable fitting may be substituted for the cutter 24 and connected to the lower end of the tool for the purpose of inserting a plug or stopper for closing the flow of fluid through the T or service line.

It will be noted that the collar or connector 36, while rotatably mounted on the tool 23, is restrained from axial movement thereon by being positioned between the shoulder 33 and the knob 47. Further, that when the collar 36 is attached to the feed sleeve 21 through the bayonet slot connection, it will be rotatably and axially movable with the feed sleeve.

As shown in Figure 1, the feed sleeve 21 is in its lowermost inward position and its downward movement is limited by the abutting engagement of the washer 33' with the top of the packing cap 26 when the cutter 24, on the lower end of the boring bar 23 (Fig. 9), has completed forming the opening 25 in the main 10. After the drilling is completed, the pins 37 on the collar 36 are manually disconnected from the bayonet slots 39 so that the unit assembly of which the boring bar 21 constitutes a part may be withdrawn until the cutter 24 clears the outer end of the T 11 and the valve seat in the valve casing 13. The feed sleeve may then be backed until the inner shoulder 69 (Fig. 8) on the lower reduced end 20 of the tubular portion 21 engages the end of the packing cap 26 so as to perform a new operation such as expanding a rubber stopper or inserting a threaded plug into the T 11.

The flanged adapter 14 (Fig. 9) is externally threaded as at 72 so as to be connected to the bottom of the valve casing 13 and is internally threaded as at 73 so as to be connected to the upper external threaded portion of the T 11. Adapters of different internal diameters are provided so that T's of different sizes may be connected to the machine, and the adapter is maintained in a fixed position relative to the T 11 and the valve casing 13 by a screw 74. The improved construction of this adapter is covered in our copending application Serial No. 79,943 filed March 7, 1949, now Patent Number 2,523,588, issued September 26, 1950.

It will be seen that the threaded connection of the sleeve 21 with the fixed tubular portion 18 of the machine controls the axial movement imparted to the boring bar or tool 23, and that while the collar 36 and its bayonet connection with the feed sleeve 21 locks the feed sleeve and boring bar against relative axial movement, the collar being loosely mounted on the boring bar allows the sleeve to be rotated independently of the boring bar. Moreover, the length of the boring bar is much shorter than heretobefore required, while the machine is compact and composed of a minimum number of parts and is easy to operate and economical in cost compared with similar machines as heretofore used.

In operation, when it is desired to form an opening such as 25 in a main in order to mount a branch connection thereon, the machine body 15 is connected to the flop valve casing 13 and the feed sleeve 21 is manually rotated to its extreme upper position prior to inserting the boring bar or tool 23 into the machine. As the collar 36 and arm 45 constitute a unit assembly with the boring bar 23, they may be inserted as a unit into the machine and the collar connected to the feed sleeve 21 through the bayonet slots 39 so that the pins 37, after being moved into the longitudinal openings 41, engage the notches 42 during the feeding operation, and as long as thrust is being applied inwardly against the pins, they will be firmly held in the slots so that they cannot move around to the vertical openings 40. The operator then rotates the handle 63 with one hand and the feed sleeve 21 with the other so as simultaneously to impart rotative and axial movement to the boring bar 23, in order that the cutter 24 will form the opening 25 in the main. When this is completed, the collar may be manually released from engagement with the sleeve 21 and the boring bar and its associated parts removed as a unit so that an expanded rubber stopper or threaded plug may be connected to the tool or boring bar. If it is desired to reverse the direction of rotation of the tool 23, the pawl 53 is turned by operation of the knob 56 so that its straight vertical edge 75 is rotated 180° so as to be brought into locking engagement with the rear walls of the teeth of the ratchet wheel 44, in order that rotation of the handle 45 counter-clockwise will rotate the tool in the same direction. It will be observed that the stud or block 61 on the inner end of the handle 63 may be provided with any suitable transverse slot or recess so as to receive and have secured to the wall thereof the pin 64, in order to be movable with the handle when the latter is swung to either its vertical or horizontal position.

It will be understood that the form of the invention shown and described is merely illustrative of a preferred embodiment and such changes may be made to the machine as fall within the scope of the following claims.

We claim:

1. A drilling machine of the class described having in combination, a tubular body member provided with an externally threaded outer end portion, a rotatable and axially movable tool extending into said body member, a manually operable feed sleeve having an internally threaded portion connected to the external threads of said body member so that rotation of the feed sleeve imparts axial movement thereto relative to the body member, said sleeve having diametrically opposed bayonet slots in the upper end thereof, a collar rotatably mounted on said tool and extending within said sleeve, means for retaining the collar on the tool, said collar having radial pins arranged to engage said slots for connecting the collar to the sleeve so as to cause the collar to be moved axially with the sleeve when the latter is rotated by one hand of the operator, and a handle operatively connected to the tool for rotating the same by the other hand of the operator, the parts being constructed and arranged so that when the collar is connected to the sleeve simultaneous rotation of the handle and the sleeve imparts axial movement to said tool.

2. A drilling machine of the class described having in combination, a tubular body member provided with an externally threaded outer end portion, a rotatable and axially movable tool extending into said body member, a feed sleeve having an internally threaded portion connected to the external threads of said body member so that rotation of the sleeve moves the same axially relative to the body member, said sleeve having an outer end portion extending beyond the outer end of said body member, the outer end portion of said sleeve having diametrically opposed bayonet slots, a collar rotatably mounted on said tool and extending within said sleeve, said collar having radial pins extending outwardly therefrom and arranged to be detachably connected to said slots for connecting the sleeve to said tool, a handle operatively connected to the outer end of said tool above said collar for rotating the tool, and means connected to the outer end of the tool for retaining the collar and handle thereon so that the collar and handle are axially movable as a unit with the tool when the collar is rotated to disconnect said pins from said bayonet slots.

3. A drilling machine of the class described having in combination, a tubular body member provided with an externally threaded outer end portion, a rotatable and axially movable tool extending into said body member, a feed sleeve having an internally threaded portion connected to the external threads of said body member so that rotation of the sleeve moves the same axially relative to the body member, said sleeve having an outer end portion extending beyond the outer end of said body member, the outer end portion of said sleeve having diametrically opposed bayonet slots, a collar rotatably mounted on said tool and extending within said sleeve, said collar having radial pins extending outwardly therefrom and arranged to be detachably connected to said slots for connecting the sleeve to said tool, a ratchet fixed to said tool above said collar, an operating handle rotatably mounted on said tool and having a pawl arranged to engage said ratchet for locking the tool to the handle, and means connected to the outer end of the tool for retaining the collar, ratchet and handle on the tool so that the same are axially movable as a unit with the tool when the collar is rotated to disconnect said pins from said bayonet slots.

4. In a machine of the class described having in combination, a rotary tool, an operating member connected at one end to said tool and extending laterally therefrom, said member at its opposite end having a pair of spaced ears provided with aligned openings, an adjustable handle having a block at its inner end extending between said ears, said block having a transverse slot, a pin fixed in said slot and having its ends extending through the openings in said ears to pivotally connect the handle to said member so that the handle may be moved to either a substantially vertical position or substantially a horizontal position relative to the operating member, a radially disposed threaded bolt connected to said pin and extending outwardly from said slot, a washer mounted on said bolt, and a nut threaded to the bolt and engaging said washer for clamping the handle in a fixed position relative to the operating member, said washer when the handle is moved to its vertical position being held by said nut in clamping engagement with the ends of said ears and when the handle is moved to its horizontal position being clamped to the bottom of the ears by said nut.

FRANK H. MUELLER.
JOHN J. SMITH.

REFERENCES CITED

The following references are of record in the file of this patent:

UNITED STATES PATENTS

| Number | Name | Date |
|---|---|---|
| 6,256 | Barnes | Apr. 3, 1849 |
| 448,633 | Cantelo | Mar. 24, 1891 |
| 462,543 | Evatt | Nov. 3, 1891 |
| 611,947 | Skinner | Oct. 4, 1898 |
| 2,268,089 | Wilson | Dec. 30, 1941 |

FOREIGN PATENTS

| Number | Country | Date |
|---|---|---|
| 344,630 | Great Britain | Mar. 12, 1931 |